UNITED STATES PATENT OFFICE.

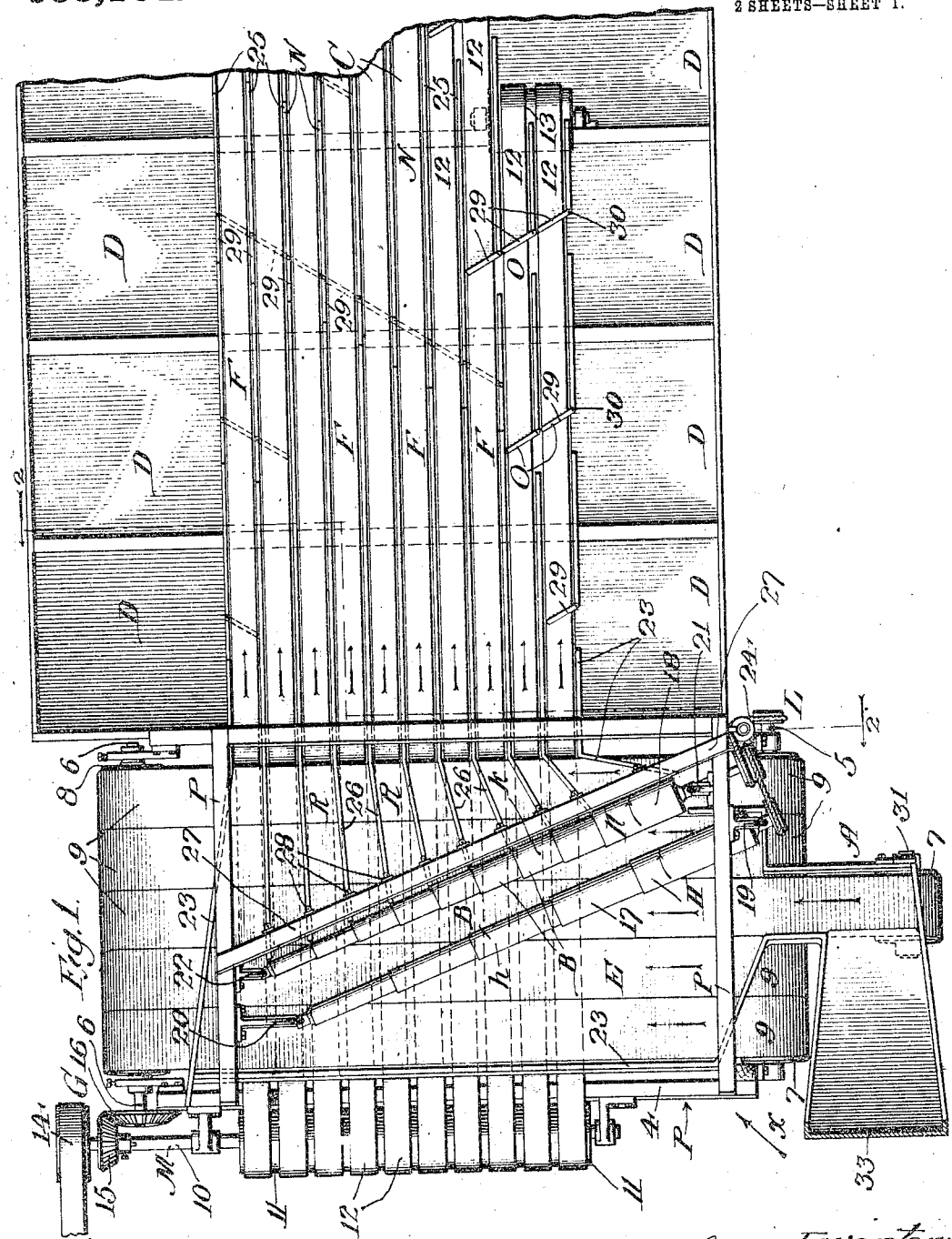

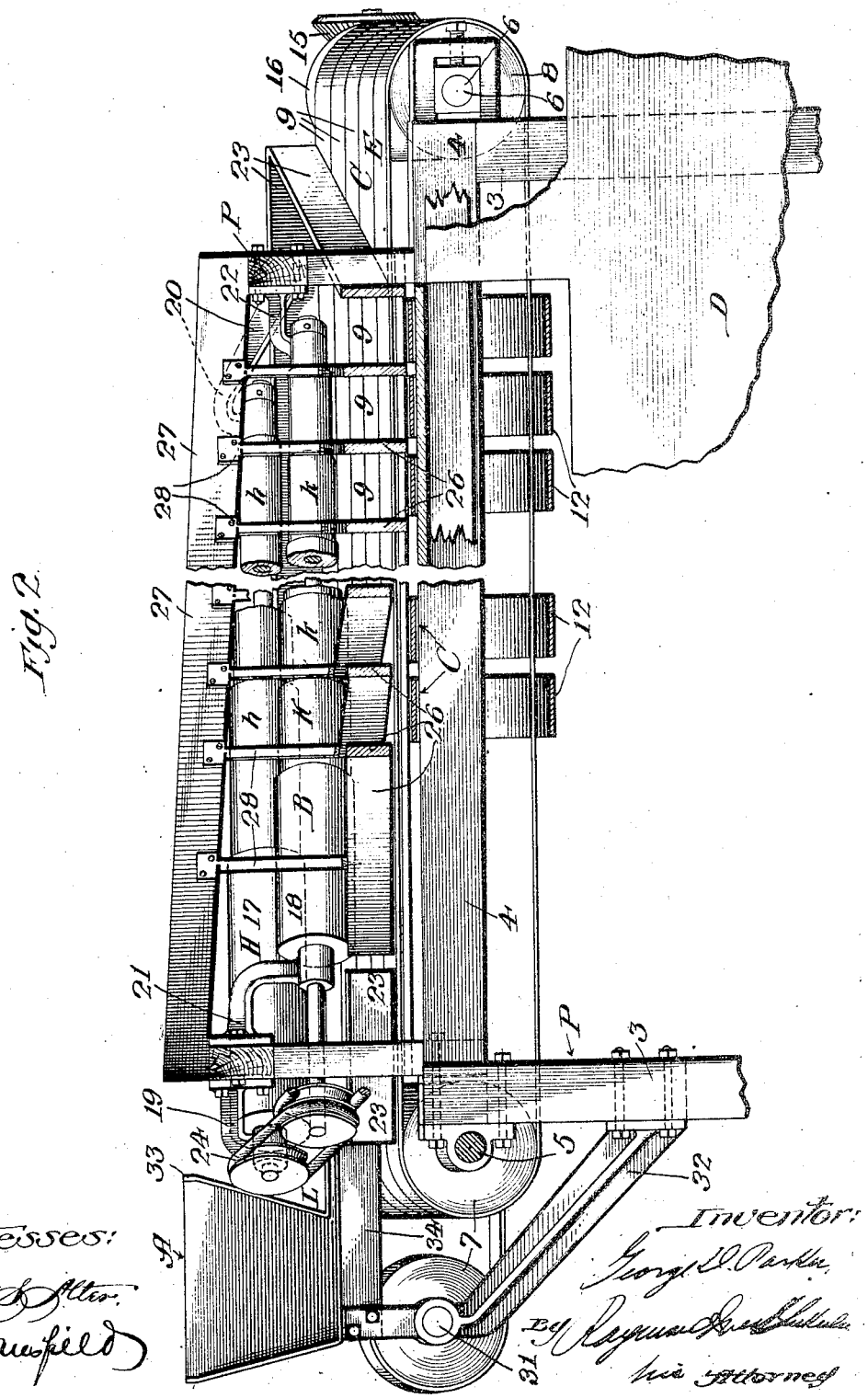

GEORGE D. PARKER, OF RIVERSIDE, CALIFORNIA.

FRUIT SIZER AND GRADER.

958,164. Specification of Letters Patent. Patented May 17, 1910.
Application filed July 8, 1908. Serial No. 442,580.

*To all whom it may concern:*

Be it known that I, GEORGE D. PARKER, a citizen of the United States, residing at Riverside, in the county of Riverside and State of California, have invented new and useful Improvements in Fruit Sizers and Graders, of which the following is a specification.

This invention relates to fruit sizers and graders and it has for its object to provide improved apparatus or mechanism of this character, whereby oranges and other fruit, which require sorting or sizing before packing may be effectually selected accordingly to size and distributed to receiving bins or points of deposit for respective sizes; which apparatus or mechanism shall be relatively simple and inexpensive in construction, positive in operation and generally superior in point of efficiency and serviceability.

A particular object of the invention consists in the provision of improved apparatus or mechanism of the character described, whereby fruit may be handled for the purposes specified, subject to a minimum of rolling or tumbling action with the attendant bruising and softening of the fruit, and whereby the fruit may be so handled without any violent agitation of the character described with similar attendant injury. In all apparatuses of this character it is necessary to roll or tumble the fruit to a certain degree in the distribution of the same according to size; but according to the present invention the fruit is led through the several stages of distribution without violent agitation, and a maximum of protection against injury is thus afforded.

The invention consists in the novel provision, construction, combination, association and relative arrangement of parts, members and features, as hereinafter set forth, disclosed in the accompanying drawings and finally set forth in claims.

In the drawings:—Figure 1 is a top plan view, partly broken away for convenience of illustration, of a fruit sizer or grader embodying the invention; and, Fig. 2 is a vertical transverse sectional view of the same, taken upon the line 2—2, Fig. 1, and looking in the direction of the appended arrows; the same being partly broken away, centrally horizontally and in other parts, for convenience of illustration.

Corresponding parts in both the figures are denoted by the same reference characters.

Referring with particularity to the drawings, the improved sizer or grader comprises means A for feeding the fruit, initial distributing means B, and final distributing means C, whereby the fruit is, after sorting, with respect to size, passed to and received by bins D, or whereby the fruit, properly sorted, is distributed to suitable points of deposit. The initial distributing means B comprises primarily a suitable conveyer or conveyers E; and the final distributing means C comprises a plurality of suitable conveyers F, there being one of such conveyers F for the final distribution of each size of the fruit; and the conveyers F being arranged adjacent to the conveyer or conveyers E in positions to receive the fruit from the latter.

G designates operating means for the distributing means B and the conveyers E associated therewith, and for the distributing means C and the conveyers F associated therewith. The initial distributing means B comprises with the conveyers E a plurality of spaced rotary elements, H and K, respectively, and the same are operated by actuating means L operatively connected with the actuating means G, as hereinafter set forth.

M designates actuating means for the conveyers F of the final distributing means C. The fruit is conducted from the feed means A to the conveyer or conveyers E, and the action of the rotary elements H and K, in combination with the action of the conveyer or conveyers E, performs the initial distributing operation, whereby the fruit is conducted to the conveyers F to the final distributing means C. In the preferred form of relative arrangement of parts and features the conveyer or conveyers E operate in paths extending appositely, divergently and rectangularly with respect to the paths of operation of the conveyers F. Preferably, as shown, a plurality of the conveyers E are employed, having their carrying surfaces in a common plane and said plane is preferably slightly inclined, both toward the plane of the carrying surfaces of the conveyers F, and laterally of such latter plane, such inclinations, resulting jointly in total inclination in the direction indicated by the arrow marked X, in Fig. 1. The carrying surfaces of the conveyers F likewise extend in a common plane which is horizontal.

The rotary elements H and K extend in parallelism and substantially in the same horizontal plane, as well as athwart the conveyers E and angularly with respect thereto. The rotary elements H and K are provided each with a plurality of operative portions, h and k, respectively, which are related to the various sizes of the fruit in a predetermined manner; there being a greater number of such operative portions of the rotary element K than of the rotary element H; and the operative portions k of the rotary element K being related to and in operative association with the respective conveyers F of the final distributing means C. The fruit is, by means of the conveyers E, first brought into engagement with the operative portions h of the rotary element H, and thence, after rough sorting, passes to the operative portions k of the rotary element K, whereby the final sorting or sizing is performed and the fruit is admitted to the conveyers F of the final distributing means C. The fruit is so conducted, after its final sorting or sizing, to the respective conveyers F, through chutes N, which extend across portions of the conveyers E and that embrace, respectively, the conveyers F. Gates O are provided for the several chutes N, and thereby the direction of the fruit from the chutes to the bins D is determined.

A particular preferred form of provision, construction, combination, association and relative arrangement of parts, members and features of an improved sizer or grader embodying the invention, and including the elements and features above set forth, is as follows:—A frame P is provided, comprising uprights or standards 3, and transverse members 4; and connected therewith, at opposite sides, in suitable journals, are conveyer shafts, 5 and 6, respectively, carrying drums, 7 and 8, respectively, about which endless belts 9, constituting the conveyers E are passed, said belts being arranged in a lateral series. Carried by said frame, at right angles to the line of shafts 5 and 6, and at one end of the apparatus, is a shaft 10, carrying a drum 11 about which are passed endless belts 12, arranged in a lateral series, and constituting the conveyers F. These belts 12 are also passed about one or more supplemental drums 13, at the other end of the apparatus, said drums being suitably supported for rotation, in any preferred manner. The actuating means G comprises a suitable belt-drive 14 for the shaft 10, and the shafts 10 and 6 are operatively connected by meshing beveled gears 15 and 16. The rotary elements H and K comprise rollers, 17 and 18, respectively, formed with a plurality of different diameters, constituting respectively, the operative portions h and k; the diameters of said operative portions being stepped down or decreased correspondingly from adjacent ends of said rollers, and in a general direction away from the feed means A. Said rollers are suitably supported by the frame P, at opposite sides of the same, as by journal brackets 19 and 20, respectively, for the roller 17 and journal brackets 21 and 22 for the roller 18; and said rollers are extended in corresponding angular relation to the paths of travel of the belts 9. The rollers 17 and 18 extend entirely transverse of the frame P; and together with the major portions of the belts 9 are inclosed by a retaining frame 23, of a regular formation, whereby displacement of the fruit in the initial sorting operation is prevented.

The actuating means L for the rotary elements or rollers 17 and 18 comprise a suitable drive, such as the rope-drive 24 illustrated, which operatively connects one end of the shaft 5 with the adjacent ends of the said rollers. The chutes N are formed by spaced partitions 25 which alternate with the belts 12 in their upper portions; it being understood that both the belts 9 and belts 12 are arranged to travel in a lower path and an upper path, each operating in a vertical plane. Said partitions 25 are supported above the bins D and extend in parallelism to the belts 9. The superficial areas of the operative portions k of the roller 18 are greater in extent, longitudinally of said roller, than the transverse dimensions of the chutes N, there being one of such operative portions k associated with each of such chutes; and to confine the carrying surface portions of the conveyers E of the belts 9, which the fruit must traverse from the respective operative portions k to the respective chutes N, supplemental chutes R are provided, being formed by spaced partitions 26 extended from the end portions of the partitions 25 to a frame member 27, which extends transversely of the frame P parallel with the roller 18 and but slightly spaced from the same; said frame member 27 being arranged between the said roller 18 and the adjacent ends of the partitions 25. The partitions 26 are connected with frame member 27 by depending brackets 28.

From the above construction and arrangement of parts it results that the chutes R are each of varying width, tapering or converging from the frame member 27 toward the chutes N. The gates O constitute, when in closed or normal position portions 29 of the partitions 25; such portions being hinged to the major portions of the partitions 25, as at 30, and being arranged to be swung laterally across the adjacent belts 12 and the carrying surfaces thereof. Said gates or partition portions 29 are of such dimensions that each of the same comes in engagement with the next adjacent partition 25 at a suitable inclination with respect to the path of travel of the fruit through the respective chute, to the end that fruit being brought by the respective belt 12 into engagement with such gate shall be deflected or directed into a bin D directly beneath. The gates O are arranged in series extending obliquely across the carrying surfaces of the belts 12, to the end, that a plurality of the same may be opened to deflect the fruit from any one chute N to any one bin D. The feed means A may utilize in its organization one or more of the belts 9, as illustrated, said belt being extended farther than the others; the same being extended beyond the others at one side of the frame P, and passed about a shaft 31 supported by a suitable bracket 32 connected with the frame P; and a suitable hopper, chute or conveyer 33, carried by the frame P and by a frame member 34, may be associated with the extended belt to complete the feed means A. The bins D, of any suitable form, are arranged beneath the conveyers F, and are of a suitable number in accordance with the longitudinal extent of the apparatus and the number of sizing or sorting operations or sub-divisions which the apparatus is intended to perform.

The operation, method of use, and advantages, will be readily understood from the foregoing description, taken in connection with the accompanying drawings and the following statement:

The conveyers E, rotary elements H and K and conveyers F all operate in the directions denoted by the respective arrows. Fruit delivered to the conveyers E, by the feed means A, is first brought into contact with the larger operative portion $h$ of the rotary element K, and any of such fruit, of the smaller sizes, as can pass under the larger operative portions $h$, to the space between the rotary elements H and K. The larger operative portions of the elements H and K are spaced but slightly above the belts 9, so that only the smallest sizes of fruit can pass beneath the same. The larger sizes of fruit admitted to the conveyers E work along the rotary elements H, due to its rotation and the feed of the conveyers and are successively passed beneath the element H in accordance with their respective sizes, thus giving a rough sorting of the fruit prior to its introduction to the space between the elements H and K. Within said space the fruit continues to work along and be brought successively into engagement with the operative portions $k$ of successive decreasing diameters; and the various sizes of fruit successively pass under said operative portions $k$, the smaller sizes first passing under and being followed by the larger sizes, as allowed by the increasingly higher spaces between the conveyers E and the respective operative portions $k$. The fruit of each size enters one of the chutes R, namely, that which is associated with the respective operative portions $k$ under which it passes, and works along the same between the partitions 26, to the respective chute N between the partitions 25 of which it is carried by the respective conveyer belt 12 until its course is interrupted by one of the gates O which shunts or deflects it directly into one of the bins D, or first through one or more of the latter chutes N, and passes two or more of the gates into the predetermined bin. If preferred, the fruit may traverse the chutes N to the ends of the conveyers F, and said conveyers being of different lengths, the fruit may be deposited in bins disposed at and beneath such extreme ends of the conveyers. This arrangement is not shown in the drawings, but is a manifest variation of the disclosure therein.

It is manifest that in the initial distribution of the fruit, as well as in the final distribution by the means D and C, the former including the rotary elements H and K and the latter including the gates O, no violent agitation or actuation or tumbling of the fruit is caused; and the fruit, through even and gradual stages is effectually sorted into the several sizes of the same, as predetermined by the dimensions of the operative portions $h$ and $k$; and is finally deflected, without injury, to the bins.

The apparatus is positive in operation and the working parts thereof are adapted for long continuous operation without deterioration in working efficiency.

Having thus described my invention, I claim and desire to secure by Letters Patent:—

1. An improved sizer or grader, comprising initial distributing means and final distributing means; said initial distributing means including a plurality of spaced rotary elements each having a plurality of operative portions respectively related to the various sizes of the fruit to be sorted; the numbers of operative portions of the rotary elements being unequal.

2. An improved sizer or grader, comprising initial distributing means, and final distributing means; said initial distributing means including a conveyer, a roller extending above the carrying surface of the conveyer and provided with a plurality of operative portions respectively related to the various sizes of the fruit to be sorted; and said final distributing means comprising a plurality of conveyers arranged adjacent to said conveyer of said initial distributing means in positions to receive fruit from the latter, and a plurality of chutes respectively embracing said conveyers of said final distributing means, and extending into juxtaposition respectively with relation to said operative portions of said roller.

3. In an improved sizer or grader, a conveyer, and a plurality of spaced rotary elements extending above the carrying surface of said conveyer and each having a plurality of operative portions of different diameters respectively related to the various sizes of the fruit to be sorted; the numbers of operative portions of the rotary elements being unequal.

4. In an improved sizer or grader, a conveyer, and two spaced rollers extending above the carrying surfaces of the conveyer and each at an angle with the path of movement of said conveyer; each of said rollers comprising a plurality of operative portions of different diameters respectively related to the sizes of the fruit to be sorted.

5. In an improved sizer or grader, a conveyer, a roller extending above the carrying surface of the conveyer and provided with a plurality of operative portions of varying diameters, means for rotating the roller, a plurality of conveyers arranged adjacent to said first-named conveyer in positions to receive fruit from the latter, and chutes embracing the last named conveyers and extending respectively into juxtaposition with relation to said operative portions of said roller.

6. In an improved sizer or grader, a conveyer, a roller extending above the carrying surface of the conveyer and provided with a plurality of operative portions of different diameters, means for rotating the roller, a plurality of conveyers arranged adjacent to said first-named conveyer in positions to receive fruit from the latter, chutes embracing the last named conveyers and extending respectively into juxtaposition with relation to said operative portions of said roller, and gates in said chutes.

7. An improved sizer or grader, comprising two sets of conveyers, the conveyers of one set being arranged adjacent to the conveyers of the other set in positions to receive fruit from the latter, a roller extending angularly above the conveyers of one set thereof and having portions of different diameters, and chutes embracing the conveyers of the other set thereof and extending respectively into juxtaposition with relation to said portions of said rollers.

8. An improved sizer or grader, comprising two sets of conveyers, the conveyers of one set being arranged adjacent to the conveyers of the other set in positions to receive fruit from the latter, a roller extending angularly above the conveyers of one set thereof and having portions of different diameters, chutes embracing the conveyers of the other set thereof and extending respectively into juxtaposition with relation to said portions of said roller, and means for jointly operating said conveyers and said roller.

In testimony whereof, I have signed my name to this specification in the presence of two subscribing witnesses.

GEORGE D. PARKER.

Witnesses:
RAYMOND IVES BLAKESLEE,
TILLIE E. ADAM.